(12) United States Patent
Cox

(10) Patent No.: US 10,344,820 B2
(45) Date of Patent: Jul. 9, 2019

(54) DIGRESSIVE VALVE FOR A DAMPER

(71) Applicant: MF IP Holding, LLC, West Jordan, UT (US)

(72) Inventor: Christopher Paul Cox, West Jordan, UT (US)

(73) Assignee: MF IP Holding, LLC, West Jordan, UT (US)

( * ) Notice: Subject to any disclaimer, the term of this patent is extended or adjusted under 35 U.S.C. 154(b) by 0 days.

(21) Appl. No.: 15/338,131

(22) Filed: Oct. 28, 2016

(65) Prior Publication Data

US 2018/0119768 A1 May 3, 2018

(51) Int. Cl.
*F16F 9/32* (2006.01)
*F16F 9/348* (2006.01)

(52) U.S. Cl.
CPC .......... *F16F 9/3488* (2013.01); *F16F 9/3214* (2013.01); *F16F 9/348* (2013.01); *F16F 2228/12* (2013.01)

(58) Field of Classification Search
CPC ..... B60G 13/08; B60G 2202/24; F16F 9/348; F16F 9/3485; F16F 9/3488
USPC ............ 188/322.15, 322.22, 282.9, 283, 313
See application file for complete search history.

(56) References Cited

U.S. PATENT DOCUMENTS

| | | |
|---|---|---|
| 4,197,929 A | 4/1980 | Imai |
| 4,972,929 A | 11/1990 | Ivers et al. |
| 5,529,398 A | 6/1996 | Bosley |
| 5,921,360 A | 7/1999 | Moradmand |
| 6,260,678 B1 | 7/2001 | Moradmand et al. |
| 6,581,734 B2 | 6/2003 | Heyn et al. |
| 6,655,512 B2 | 12/2003 | Moradmand et al. |
| 7,238,112 B2 | 7/2007 | Bastel et al. |
| 7,980,368 B2 | 7/2011 | Park |
| 8,517,154 B2 | 8/2013 | Maeda |
| 2002/0063023 A1 | 5/2002 | Moradmand et al. |
| 2004/0166764 A1 | 8/2004 | Stark |
| 2005/0056505 A1* | 3/2005 | Deferme .................. 188/322.15 |
| 2006/0283676 A1* | 12/2006 | Deferme ............... B60G 17/08 188/322.13 |
| 2009/0057080 A1* | 3/2009 | Deferme ............... F16F 9/3488 188/313 |

(Continued)

FOREIGN PATENT DOCUMENTS

WO 2015/158495 A1 10/2015

*Primary Examiner* — Bradley T King
*Assistant Examiner* — San M Aung
(74) *Attorney, Agent, or Firm* — Christensen O'Connor Johnson Kindness PLLC

(57) ABSTRACT

Generally described, aspects of the disclosed subject matter are directed to dampers having shimmed pistons. In accordance with aspects of the present disclosure, the dampers generally include a shaft having a piston with compression and rebound valves extending therethrough. The piston interfaces a shim assembly at the valve outlets such that damping fluid flow is controlled through a set of valves in one direction, and the damping fluid flow is limited through the same set of valves in the opposite direction. In this regard, the shim assembly is configured to deflect away from the piston as a result of damping fluid flow through the first valve. The shim assembly generally includes a ring shim that interfaces a shim stack to provide a configurable preload for the deflectable shims.

19 Claims, 10 Drawing Sheets

(56) References Cited

U.S. PATENT DOCUMENTS

| | | | |
|---|---|---|---|
| 2013/0319804 A1* | 12/2013 | Six | F16F 9/26 188/313 |
| 2015/0041264 A1* | 2/2015 | Goldasz | F16F 9/3484 188/313 |
| 2015/0159724 A1 | 6/2015 | Kiyonaga | |
| 2015/0316118 A1 | 11/2015 | Smeljanskij et al. | |
| 2016/0017914 A1 | 1/2016 | Visseus et al. | |

* cited by examiner

DIGRESSIVE VALVE FOR A DAMPER

BACKGROUND

A damper provides a damping force in reaction to motion. A damper is typically filled with a damping fluid to provide fluidic resistance to the motion of a piston traveling through the damping fluid. A conventional piston generally includes valves for compression flow of damping fluid and valves for rebound flow of damping fluid. In this regard, shims are used to block one set of valves during each motion of the piston. For example, if the damper is experiencing a compression stroke, the rebound valves are blocked by the rebound shims. Conversely, when the damper is in a rebound stroke, the compression valves are blocked by the compression shims.

Shim configuration can greatly impact the performance and damping characteristics of the damper. Generally, a combination of different thicknesses and sizes of shims (referred to as a "shim stack") is used to tailor the characteristics of the damper during use. Shims are typically metallic discs that are capable of bending with a low rate of fatigue. In this regard, spring steel is often a material used for the shims. When the damper is in a compression stroke, and the rebound valves are blocked by the rebound shims, the compression shim stack is necessarily bent away from the compression valves to allow flow of the damping fluid through the piston. The rate of the flow determines the damping force. If the compression shim stack allows freely flowing damping fluid through the compression valves, the damping effect will be small. If the compression shim stack greatly restricts flow of damping fluid through the compression valves, the damping effect will be high.

Given the influence of the shim stack on the performance and damping characteristics of the damper, the shims are often configured in a manner that provides consistent and repeatable damper performance. The damper can be tuned by adjusting the shim stacks. In one configuration, a shim stack can be preloaded such that the shims do not bend to allow flow through the piston valves until a certain damper speed is reached. In this regard, the low speed travel of the damper has a higher damping force before the shim stack bends to allow flow through the piston valves. A variety of configurations for preloading the shim stack exist in conventional dampers. In one example, a digressive piston is used to apply a preload to the shim stack. Digressive pistons can be expensive and require very specific installations to perform as desired. Another configuration to preload the shim stack is to use a ring shim. In this type of preload configuration, the ring shim is positioned within the shim stack to bend, or preload, the shim stack. Often the ring shim can become misaligned, giving inconsistent performance characteristics for the damper.

Therefore, a need exists for an improved preloaded shim stack configuration that eliminates the performance inconsistencies of the damper, without using a digressive piston. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a damper having a shimmed piston is provided. The damper generally includes an elongate shaft having a first end configured to retain the piston, the piston having a proximal end, a distal end, and a first valve extending therethrough; and a first shim assembly disposed around the elongate shaft at the first end and adjacent to the proximal end of the piston. The first shim assembly generally includes a first shim configured to overlap the first valve at the proximal end of the piston; a first ring shim assembled to the first end of the elongate shaft and configured to abut the first shim; and a second shim associated with the first ring shim, the second shim interfacing a radially inward projection of the first ring shim such that when the second shim is installed at the first end of the elongate shaft, the second shim is deflectable to provide a preload to the first shim assembly, wherein the first shim assembly may be configured to deflect away from the piston as a result of damping fluid flow through the first valve.

In accordance with another embodiment of the present disclosure, a damper having a shimmed piston is provided. The damper generally includes an elongate shaft having a first end configured to retain the piston, the piston having a proximal end, a distal end, and first and second valves extending therethrough; a first shim assembly disposed around the elongate shaft at the first end, and adjacent to the proximal end of the piston. The first shim assembly generally includes a first shim configured to overlap the first valve at the proximal end of the piston; a first ring shim assembled to the first end of the elongate shaft and configured to abut the first shim; and a second shim associated with the first ring shim, the second shim interfacing a radially inward annular projection of the first ring shim such that when the second shim is installed at the first end of the elongate shaft, the second shim is deflectable to provide a preload to the first shim assembly, and a second shim assembly disposed around the elongate shaft at the first end adjacent to the distal end of the piston, the second shim assembly comprising a third shim configured to overlap the second valve at the distal end of the piston, wherein the first shim assembly may be configured to deflect away from the piston as a result of damping fluid flow through the first valve, and wherein the second shim assembly may be configured to deflect away from the piston as a result of damping fluid flow through the second valve.

In accordance with any of the embodiments described herein, the damper may further include a second valve extending through the piston; and a second shim assembly disposed around the elongate shaft at the first end adjacent to the distal end of the piston, the second shim assembly comprising a third shim configured to overlap the second valve at the distal end of the piston, wherein the third shim may be configured to deflect away from the piston as a result of damping fluid flow through the second valve.

In accordance with any of the embodiments described herein, the second shim assembly may further include a second ring shim assembled to the first end of the elongate shaft and configured to abut the third shim; and a fourth shim associated with the second ring shim, the fourth shim interfacing a radially inward projection of the second ring shim such that when the fourth shim is installed at the first end of the elongate shaft, the fourth shim may be selectively deflectable to provide a preload to the second shim assembly.

In accordance with any of the embodiments described herein, the damper may further include a first washer having a first thickness, the first washer disposed between the first shim and the second shim, wherein the first thickness may limit the deflection of the second shim upon installation.

In accordance with any of the embodiments described herein, the damper may further include a second washer having a second thickness, the second washer disposed between the third shim and the fourth shim, wherein the thickness of the second washer may limit the deflection of the fourth shim upon installation In accordance with any of the embodiments described herein, the second valve may be configured to allow damping fluid flow therethrough during a rebound stroke of the damper.

In accordance with any of the embodiments described herein, the first valve may be configured to allow damping fluid flow therethrough during a compression stroke of the damper.

In accordance with any of the embodiments described herein, the first ring shim may have a wall projecting axially from a surface of the radially inward projection configured to stiffen the first ring shim upon installation.

In accordance with any of the embodiments described herein, the radially inward projection of the first ring shim may have an axial thickness of about 0.040 inches.

In accordance with any of the embodiments described herein, the second shim is selectively deflectable.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
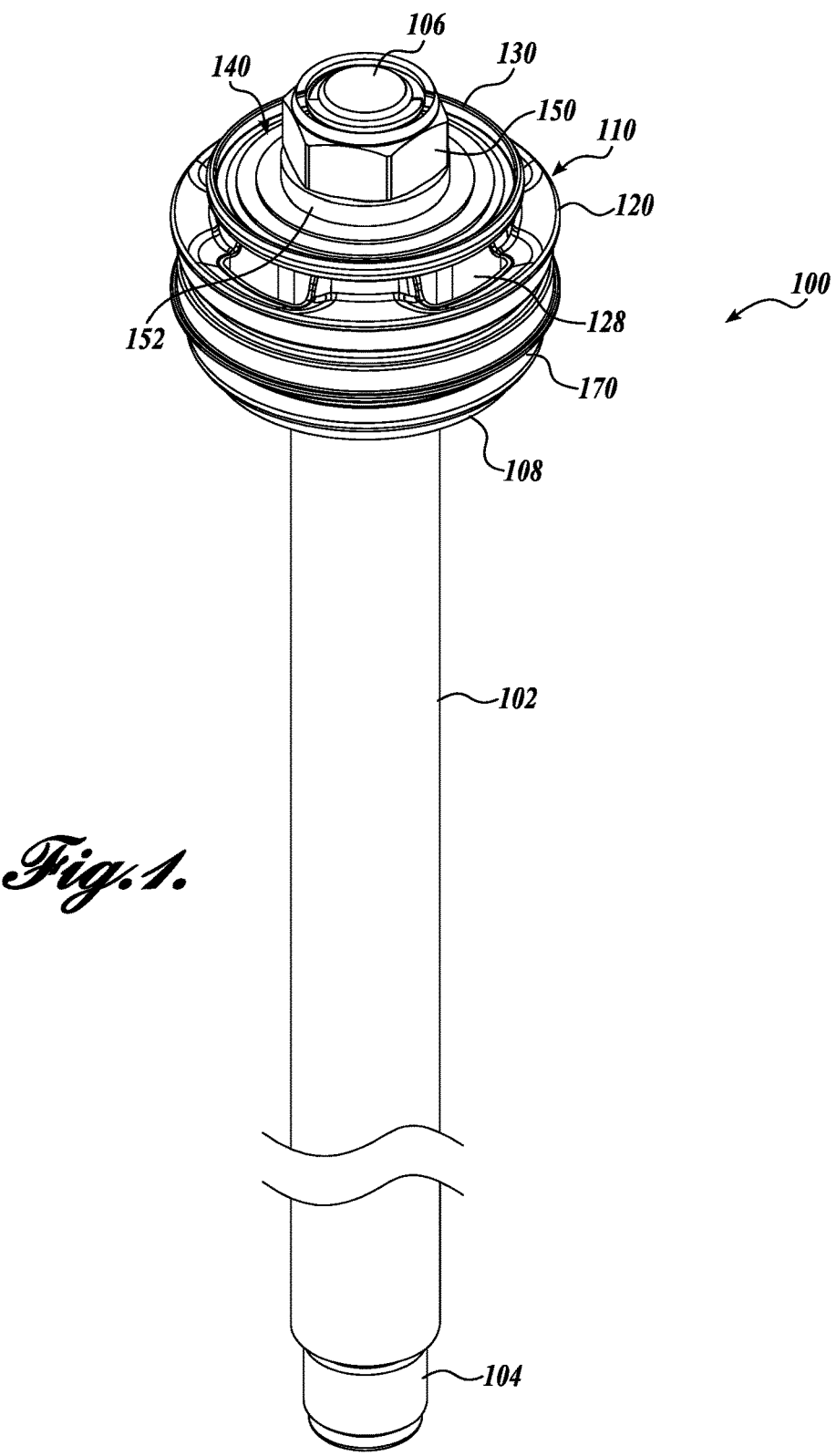
FIG. 1 is a front top perspective view of one representative embodiment of a damper valve assembly in accordance with an aspect of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to dampers having shimmed pistons to provide a damping effect. Embodiments of the present disclosure are generally directed to adjusting the damping characteristics of a damper using shim configurations in conjunction with a piston. Embodiments of the dampers disclosed herein are suitable to attach to any components between which a damping force is desired (e.g., a vehicle suspension system). Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A damper having a shimmed piston generally includes an elongate shaft with a piston fixed at one end. As the shaft travels in an axial direction, the piston travels through hydraulic damping fluid in a central bore of the damper body. The piston generally includes apertures (referred to as "valves") extending through the piston and sized such that the valves provide fluidic resistance as the piston travels through the hydraulic damping fluid. In this regard, the movement of the piston through the hydraulic damping fluid provides a force counter to the movement of the shaft, resulting in a damping effect of the motion of the shaft. The force provided by the hydraulic damping fluid is dependent on a range of factors, including hydraulic damping fluid viscosity, temperature, pressure, purity, composition; shaft velocity; and piston aperture size and shape, among other factors.

In a damper with a piston designed for use with a shim assembly (often referred to as a "shim stack"), the valves in the piston are configured such that only certain of the valves are intended for hydraulic damping fluid flow during a compression stroke of the damper (insertion of the shaft within the damper body), and certain other of the valves are intended for hydraulic damping fluid flow during a rebound stroke of a damper (extension of the shaft from the damper body). As a result, the valves can be tailored or "tuned" to exhibit the desired damping characteristics depending on the intended use of the damper. If shims were not used with the piston, an excess of hydraulic damping fluid would simultaneously flow through all of the valves, and would provide a low damping effect.

To limit the flow to only the designated valves, upon assembly of the damper, a shim stack is used to overlap the valve openings such that the flow of hydraulic damping fluid is only allowed in one direction in the valves intended for the compression stroke (compression valves), and in the opposite direction in the valves intended for the rebound stroke (rebound valves). In this regard, the hydraulic damping fluid flows through the valve and exerts a force on the shim stack such that the shim stack deflects away from the valve and allows the flow of hydraulic damping fluid. Since an opposing shim stack is overlapping the other set of valves, flow is contained within only the intended valves when the shaft of the damper is moving in either direction.

A shim stack used in conventional dampers has a wide variety of configurations. In general, the shims are arranged such that they provide a certain resistance to the flow of the hydraulic damping fluid through the valves. The valves have a shape and size to correspond to desired flow characteristics of the piston. In the illustrated embodiments, the compression and rebound valves are shown with one representative embodiment; however, in other embodiments, any suitable piston valve configuration is used in conjunction with the ring shim of the present disclosure. As a result of separate shim stacks assembled to the valves of the piston, the characteristics of the damper can be controlled independently in compression and rebound operation. Often, adjustment to the compression and rebound is achieved independently and allows tailoring of the damper to the specific application. For example, in an automotive damper working in conjunction with a spring, a high damping effect on the compression stroke can lead to a harsher ride, but can assist in maintaining stability for high-speed operation. The rebound stroke having a high damping effect can lead to a ratcheting effect of the suspension where the damper does not allow quick enough movement to return to an optimal setting after encountering a series of compressions. Therefore, a damper must be tailored to a specific application while taking into account, weight, terrain, spring forces, performance expectations, ride quality, etc.

A damper typically has different damping effect depending on the speed of the shaft. In this regard, slow speed damping can be controlled using different valves than the valves intended for high speed damping. Using the automotive damper as an example, the slow speed damping may include rolling over the crest of a hill, or the compression of the suspension as the vehicle dives while braking or rotates into a corner. In contrast, the high speed damping may include hitting a bump at speed or driving on an uneven road surface. Often a damper will be designed to exhibit different damping characteristics for slow and high speed damping. In this regard, preload of the shim stack can be used to tailor of damping characteristics. Preloading the shim stack involves the shims being slightly deflected in a neutral state by the configuration of the assembly of the shaft and piston. Among other advantages, such as consistency of damping characteristics, a preload of the shim stack can limit the opening of the shims (deflection) to only certain higher speeds of the shaft of the damper. The preload may prevent the shims from deflecting during the aforementioned slow speed damping, while allowing high speed damping.

Continuing with the automotive example, the performance of a vehicle may improve by providing a higher damping force during slow speed damping, and a lower damping force during high speed damping. In this example, the cornering (slower speed damping) of the vehicle may improve by keeping the chassis in a relatively neutral position, while encountering a sharp bump in that corner (high speed damping) allows the damper to deflect quickly with the bump and improve the contact of the tire with the road surface, increasing grip. Many other examples exist, such as having a higher damping effect during pedaling of a bicycle (slow speed damping) as opposed to a lower damping effect during bumps (high speed damping) for a smoother ride, especially while on an unimproved road. Although these examples are used to illustrate the potential uses for tailoring of a damper using shim stacks, it should be appreciated that the embodiments of the present disclosure are intended for any suitable shim configuration and damping installation.

Referring initially to FIGS. 1-5, a first exemplary embodiment of a shimmed piston assembly 100 suitable for use with a damper (not shown) is depicted. The shimmed piston assembly 100 is shown coupled to one end of a shaft 102 having a distal end 104 and a proximal end 106. The distal end 104 of the shaft 102 is typically configured to couple with a mounting joint (not shown) to attach to a component for which a damping effect is desired. In the embodiments of the present disclosure, the proximal end 106 of the shaft 102 is configured to carry the shimmed piston assembly 100 with a necked section 112 of the shaft 102. The shimmed piston assembly 100 is secured to the necked section 112 with a fastener assembly, such as a nut 150, interfacing a threaded section 114 of the shaft 102 (see FIG. 4), and an upper washer 152 disposed between the nut 150 and the shimmed piston assembly 100. In the illustrated embodiment, the nut 150 is preferably a locking nut such that movement of the shaft 102 does not allow the nut 150 to loosen over time. In other embodiments, the nut 150 is coupled to the threaded section 114 using a locking fluid (not shown). In further embodiments, the nut 150 is installed with a sufficient torque such that the nut 150 does not loosen during use of the damper.

The shimmed piston assembly 100 is secured distal to the nut 150 using a primary washer 108, which is configured to interface a shoulder at a transition between the necked section 112 and the shaft 102 to prevent sliding movement of the shimmed piston assembly 100 along the shaft 102. In other embodiments, the shimmed piston assembly 100 is coupled to any suitable location along the shaft 102 using any suitable coupling.

The shimmed piston assembly 100 will now be described in detail. As shown most clearly in FIG. 2, one embodiment of the shimmed piston assembly 100 includes a piston 120 having rebound valves 126 and compression valves 128 extending therethrough. The rebound valves 126 are configured to allow the flow of hydraulic damping fluid during the rebound stroke (extension) of the shaft 102. Conversely, the compression valves 128 are configured to allow the flow of hydraulic damping fluid during the compression stroke (insertion) of the shaft 102. Although one representative embodiment of the rebound and compression valves 126 and 128 is shown, any suitable valve configuration can be used with the embodiments of the present disclosure.

The rebound valves 126 of the piston 120 interface a rebound shim assembly 110 disposed between the piston 120 and the upper washer 152. The rebound shim assembly 110 is configured to overlap the rebound valves 126 such that flow of the hydraulic damping fluid is prevented during the compression stroke, and limited by the rebound shim assembly 110 during the rebound stroke. As described above, for flow of the hydraulic damping fluid through the rebound valves 126 during a rebound stroke, the rebound shim assembly 110 must necessarily deflect away from the piston 120 to incrementally open the passageway through the rebound valves 126. In the illustrated embodiment, the rebound shim assembly 110 completely overlaps the rebound valves 126. In other embodiments, the rebound shim assembly 110 overlaps a portion of the rebound valves 126.

In a similar manner, the compression valves 128 of the piston 120 interface a compression shim assembly 180 disposed between the piston 120 and the primary washer 108. The compression shim assembly 180 is configured to overlap the compression valves 128 such that flow of the hydraulic damping fluid is prevented during the rebound stroke, and limited by the compression shim assembly 180 during the compression stroke. As described above, for flow of the hydraulic damping fluid through the compression valves 128 during a compression stroke, the compression shim assembly 180 must necessarily deflect away from the piston 120 to incrementally open the passageway through the compression valves 128. In the illustrated embodiment, the compression shim assembly 180 completely overlaps the compression valves 128. In other embodiments, the compression shim assembly 180 overlaps a portion of the rebound valves 128. Each of the rebound and compression shim assemblies 110 and 180 includes various components configured to affect the damping characteristics. Although representative embodiments are illustrated and described herein, it should be appreciated that any shim configuration is suitable for use with the present disclosure, and the advantages are not limited to the configurations illustrated and described herein.

The components of the rebound and compression shim assemblies 110 and 180 will now be described in more detail. Initially referring to the rebound shim assembly 110, as shown most clearly in FIGS. 2 and 3, a rebound overlap shim 122 is configured to closely interface the piston 120 and overlap the rebound valves 126 as described above. The rebound overlap shim 122 provides the initial sealing component to prevent flow of the hydraulic damping fluid through the rebound valves 126 during the compression stroke of the shaft 102. The interface of the rebound overlap shim 122 with the rebound valves 126 of the piston 120 is shown in FIG. 4. As illustrated, the rebound overlap shim 122 overlaps the rebound valve 126 to prevent the flow of hydraulic damping fluid while the piston travels in the direction of the compression stroke (i.e., travel in a direction leading with the proximal end 106 of the shaft 102).

Adjacent to the rebound overlap shim 122 is assembled at least one rebound preload adjustment washer 124, which will be described in greater detail below. At an outer perimeter of the rebound overlap shim 122, a rebound preload ring shim 130 is adjacent to the rebound overlap shim 122. Next, a rebound shim stack assembly 140 is disposed adjacent a radially inward annular projection 166 (see FIG. 10) of the rebound preload ring shim 130. The rebound shim stack assembly 140 interfaces the radially inward annular projection 166 in an axial direction, and the necked section 112 of the shaft 102 in a radial direction at the inner aperture of each shim in the rebound shim stack assembly 140. The rebound shim stack assembly 140 is illustrated as having a first rebound shim 132, a second rebound shim 134, a third rebound shim 136, and a fourth rebound shim 138, each shim in order of descending outer radius away from the rebound preload ring shim 130. The first rebound shim 132 is radially sized to interface a circumferential projection 168 (see FIG. 10) of the rebound preload ring shim 130.

As can be seen most clearly in FIG. 4, the stacked configuration of the rebound shim assembly 110 includes a gap between the first rebound shim 132 and the rebound preload adjustment washer 124. To set a preload in the rebound shim assembly 110 the aforementioned gap is reduced by tightening the nut 150 during assembly, such that the first rebound shim 132 and the rebound preload adjustment washer 124 abut (see FIG. 5). The rebound shim stack assembly 140 is deflected as a result of drawing the first rebound shim 132 to the rebound preload adjustment washer 124 during tightening of the nut 150. In this configuration, the amount of preload on the rebound shim stack assembly 140 can be controlled by the width of the gap. During use of the shimmed piston assembly 100, all of the components of the rebound shim assembly 110 deflect away from the piston 120 to allow hydraulic damping fluid flow through the rebound valves 126.

Figure 10:
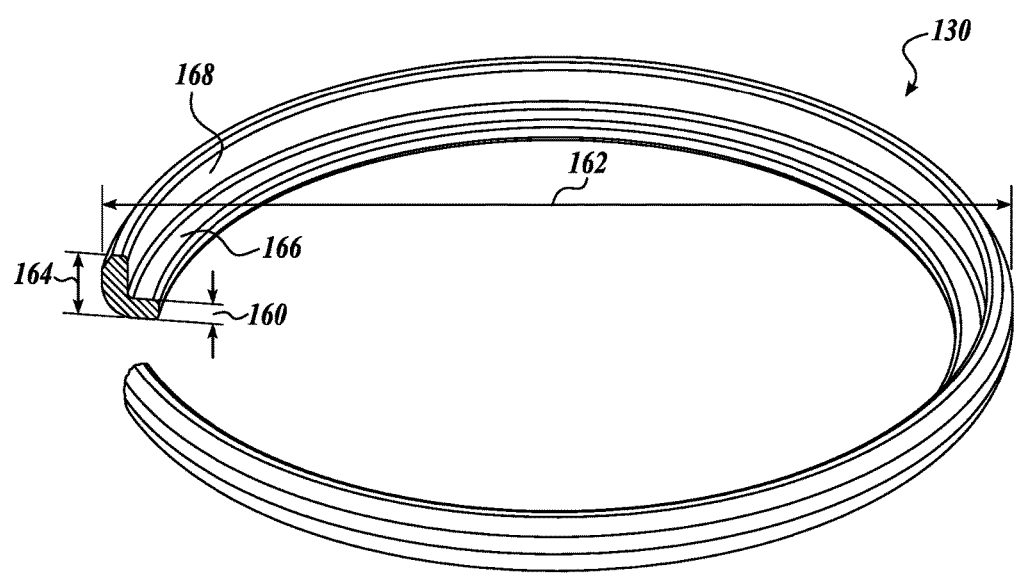
FIG. 10 is a front top perspective cutaway view of a ring shim of the damper valve assembly of FIG. 1.

The rebound preload adjustment will now be described in detail. As shown in FIG. 10, the rebound preload ring shim 130 includes the radially inward annular projection 166 having a ring shim axial thickness 160, and the circumferential projection 168 having a ring shim height 164. The rebound preload ring shim 130 also has a diameter 162. The diameter 162 is sized such that the first rebound shim 132 will fit within the aperture of the circumferential projection 168 and abut an upper surface of the radially inward annular projection 166. As can be appreciated by the configuration shown in FIG. 4, the gap between the first rebound shim 132 and the rebound preload adjustment washer 124 is controlled by the ring shim axial thickness 160 and the thickness of the rebound preload adjustment washer 124. In one example, if a preload gap distance of 0.020" is desired, the ring shim axial thickness 160 can be 0.040" and the rebound preload adjustment washer 124 can be 0.020" to arrive at the desired 0.020" preload gap distance. In other embodiments, any combination of ring shim axial thickness 160 and thickness of the rebound preload adjustment washer 124 is used to suitably control the preload gap distance. In further embodiments, the rebound preload adjustment washer 124 is omitted, or more than one rebound preload adjustment washer 124 is used with the configuration. In embodiments where the rebound preload adjustment washer 124 is omitted, the first rebound shim 132 directly abuts the rebound overlap shim 122 upon drawing the components together with the nut 150.

One advantage of assembling the rebound shim assembly 110 with the rebound preload adjustment washer 124 and the rebound preload ring shim 130 is to limit the need for rebound preload ring shims 130 with a wide variety of ring shim axial thicknesses 160. In this regard, fewer part variations can be manufactured and adapted to fit a wider range of preload settings. In another aspect, as a result of the radial interface of the first rebound shim 132 with the circumferential projection 168, the rebound preload ring shim 130 is substantially axially centered with respect to the shaft 102.

The circumferential projection 168 additionally provides structural rigidity to the rebound preload ring shim 130 for further consistency in preload settings and damping characteristics of the assembly.

Figure 2:
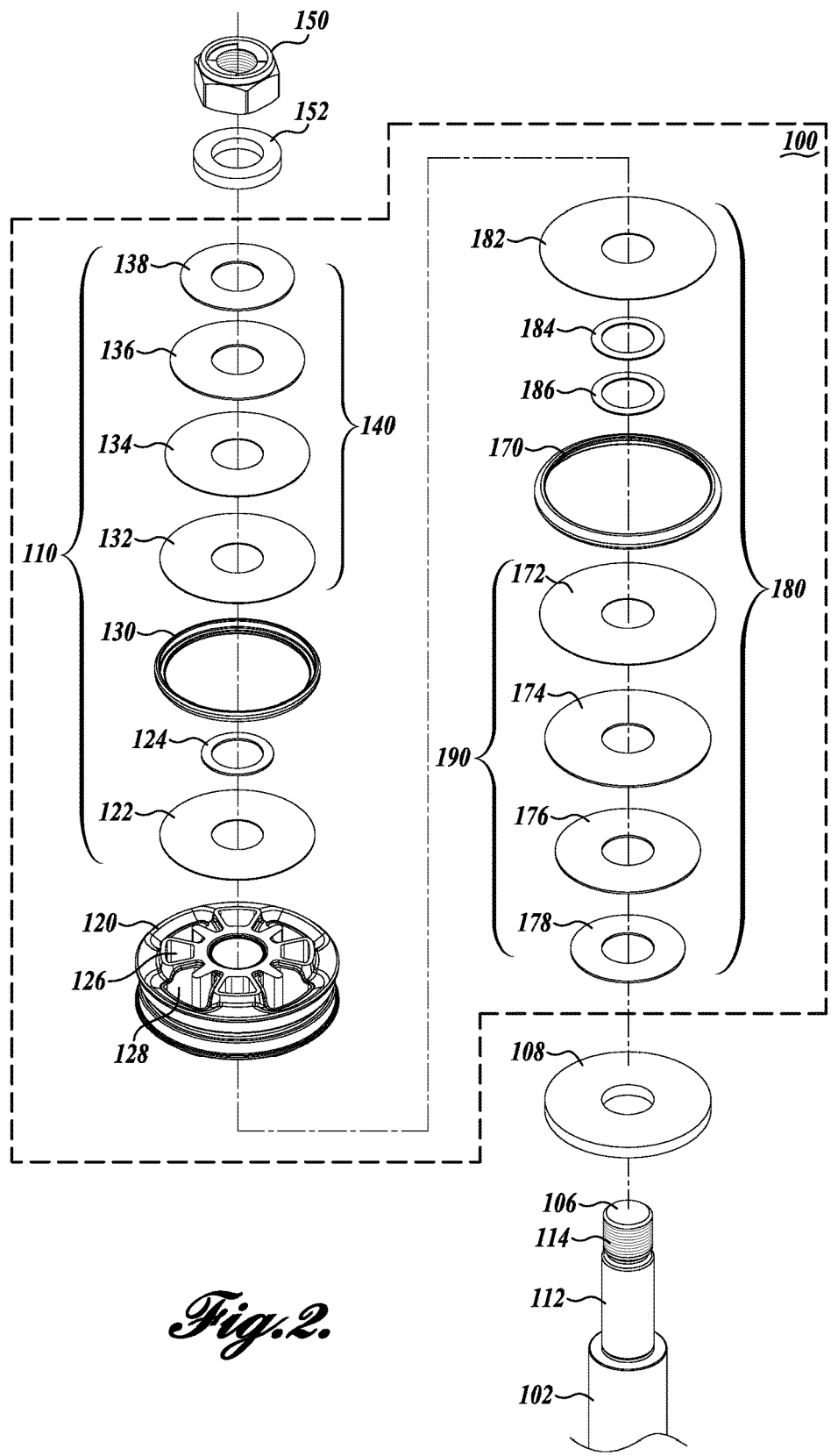
FIG. 2 is a front top exploded view of the damper valve assembly of FIG. 1.
Figure 3:
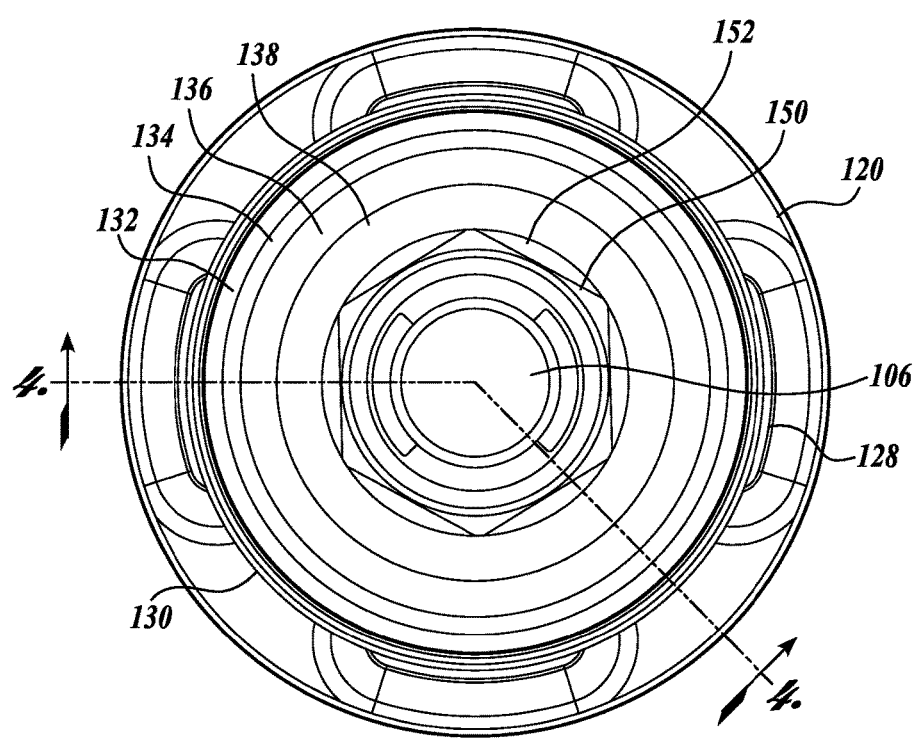
FIG. 3 is a top view of the damper valve assembly of FIG. 1.
Figure 4:
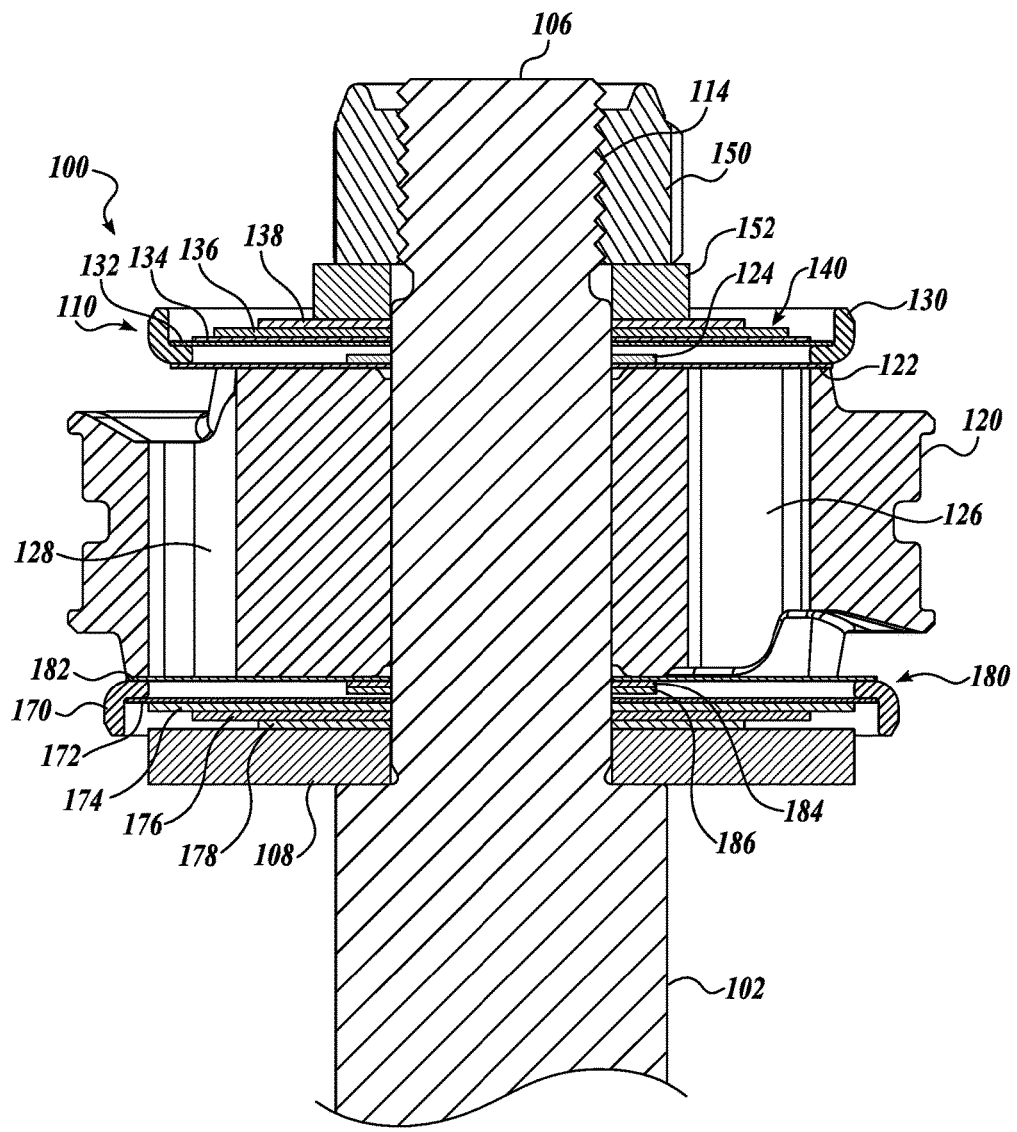
FIG. 4 is a cutaway side view of the damper valve assembly of FIG. 1, showing the cut along arrows 4-4 as indicated in FIG. 3.
Figure 5:
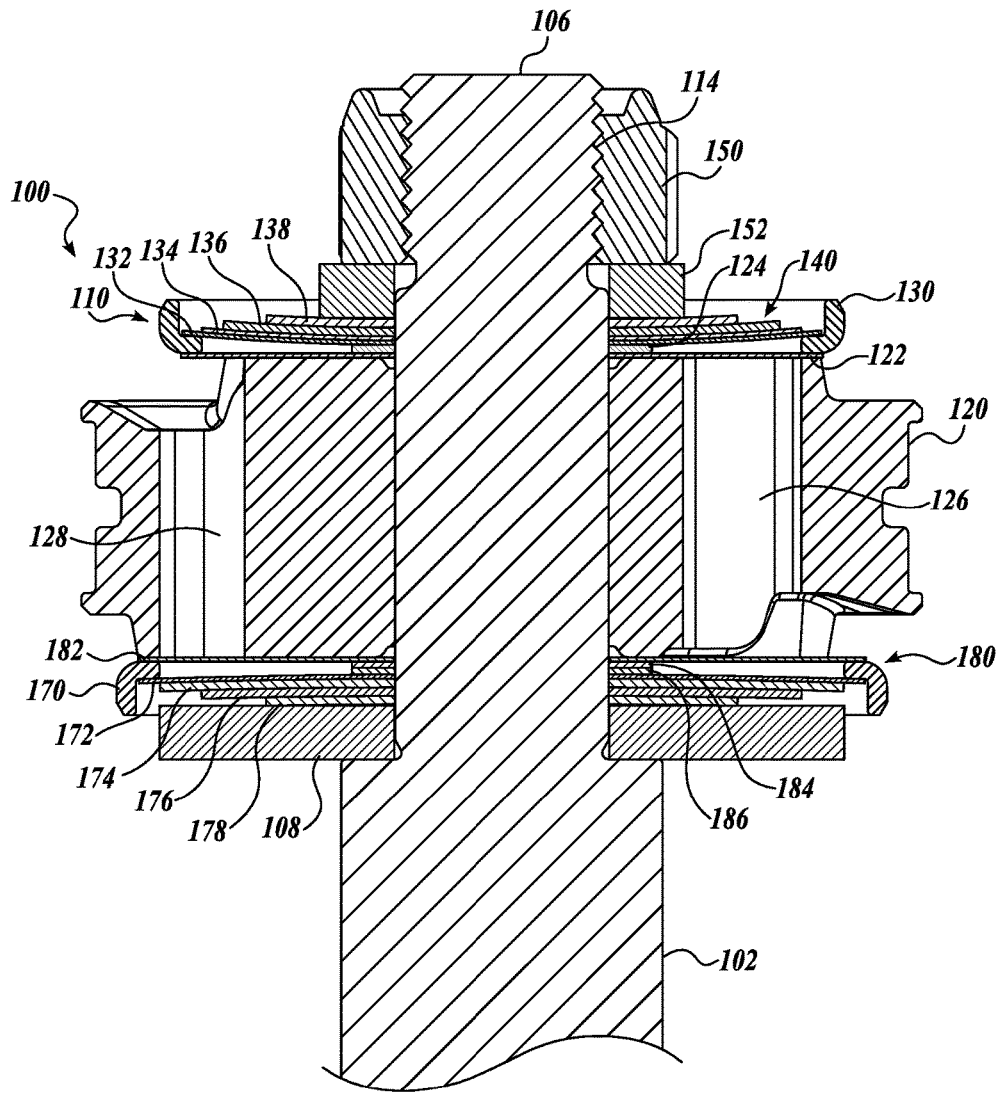
FIG. 5 is a cutaway side view of the damper valve assembly of FIG. 1, showing the cut along arrows 4-4 as indicated in FIG. 3, with a compression shim stack and a rebound shim stack in preloaded configurations.

Now referring to the compression shim assembly 180, as shown most clearly in FIGS. 2 and 3, a compression overlap shim 182 is configured to closely interface the piston 120 and overlap the compression valves 128 as described above. The compression overlap shim 182 provides the initial sealing component to prevent flow of the hydraulic damping fluid through the compression valves 128 during the rebound stroke of the shaft 102. The interface of the compression overlap shim 182 with the compression valves 128 of the piston 120 is shown in FIG. 4. As illustrated, the compression overlap shim 182 overlaps the compression valve 128 to prevent the flow of hydraulic damping fluid while the piston travels in the direction of the rebound stroke (i.e., travel in a direction leading with the distal end 104 of the shaft 102).

Adjacent to the compression overlap shim 182 is assembled a first compression preload adjustment washer 184 and a second compression preload adjustment washer 186, which will be described in greater detail below. At an outer perimeter of the compression overlap shim 182, a compression preload ring shim 170 is adjacent to the compression overlap shim 182. Next, a compression shim stack assembly 190 is disposed adjacent a radially inward annular projection (not shown, but substantially similar to 166 in FIG. 10) of the compression preload ring shim 170. The compression shim stack assembly 190 interfaces the radially inward annular projection in an axial direction, and the necked section 112 of the shaft 102 in a radial direction at the inner aperture of each shim in the compression shim stack assembly 190. The compression shim stack assembly 190 is illustrated as having a first compression shim 172, a second compression shim 174, a third compression shim 176, and a fourth compression shim 178, each shim in order of descending outer radius away from the compression preload ring shim 170. The first compression shim 172 is radially sized to interface a circumferential projection (not shown, but substantially similar to 168 in FIG. 10) of the compression preload ring shim 170.

As can be seen most clearly in FIG. 4, the stacked configuration of the compression shim assembly 180 contains a gap between the first compression shim 172 and the second compression preload adjustment washer 186. To set a preload in the compression shim assembly 180 the aforementioned gap is drawn together by tightening the nut 150 during assembly, such that the first compression shim 172 and the second compression preload adjustment washer 186 abut (see FIG. 5). As shown in the transition from FIG. 4 to FIG. 5, the compression shim stack assembly 190 is deflected as a result of drawing the first compression shim 172 to the second compression preload adjustment washer 186 during tightening of the nut 150. In this configuration, the amount of preload on the compression shim stack assembly 190 can be controlled by the width of the gap.

The compression preload adjustment will now be described in detail below. The compression preload ring shim 170 is substantially similar to the rebound preload ring shim 130 shown in FIG. 10, including the radially inward annular projection having a ring shim axial thickness, and the circumferential projection having a ring shim height. The compression preload ring shim 130 also has a diameter sized such that the first compression shim 172 fits within the aperture of the circumferential projection and abuts an upper surface of the radially inward annular projection. As can be appreciated by the configuration shown in FIG. 4, the gap between the first compression shim 172 and the second compression preload adjustment washer 186 is controlled by the ring shim axial thickness and the thickness of the first and second compression preload adjustment washers 184 and 186. In one example, if a preload gap distance of 0.010" is desired, the ring shim axial thickness can be 0.040" and the first compression preload adjustment washer 184 can be 0.020" in thickness, with the second compression preload adjustment washer 186 at a thickness of 0.010" to arrive at the desired 0.010" preload gap distance. In other embodiments, any combination of ring shim axial thickness and thickness of the first and second compression preload adjustment washers 184 and 186 is used to suitably control the preload gap distance. In further embodiments, the first and second compression preload adjustment washers 184 and 186 are omitted, a single compression preload adjustment washer is used, or more than two compression preload adjustment washers are used with the configuration. In embodiments where the first and second compression preload adjustment washers 184 and 186 are omitted, the first compression shim 172 directly abuts the compression overlap shim 182 upon drawing the components together with the nut 150.

Like the rebound shim assembly 110, one advantage of assembling the compression shim assembly 180 with the first and second compression preload adjustment washers 184 and 186, and the compression preload ring shim 170, is to limit the need for compression preload ring shims 170 with a wide variety of ring shim axial thicknesses. In this regard, fewer part variations can be manufactured and adapted to fit a wider range of preload settings. In another aspect, as a result of the radial interface of the first compression shim 172 with the circumferential projection of the compression preload ring shim 170, the compression preload ring shim 170 is substantially axially centered with respect to the shaft 102. The circumferential projection of the compression preload ring shim 170 additionally provides structural rigidity to the compression preload ring shim 130 for further consistency in preload settings and damping characteristics of the assembly.

Figure 6:
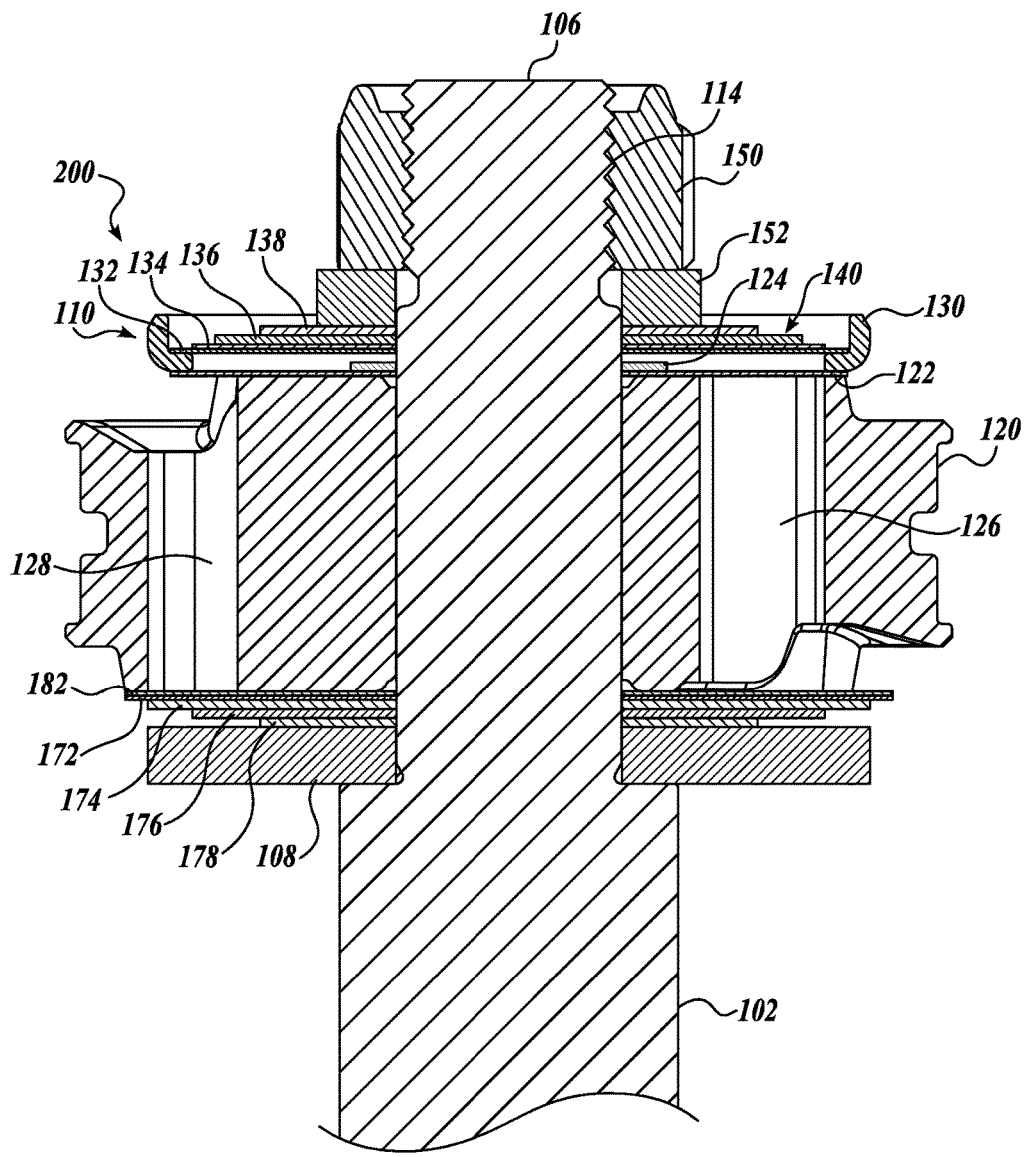
FIG. 6 is a cutaway side view of another representative embodiment of a damper valve assembly in accordance with an aspect of the present disclosure, showing the cut along arrows 4-4 as indicated in FIG. 3.
Figure 7:
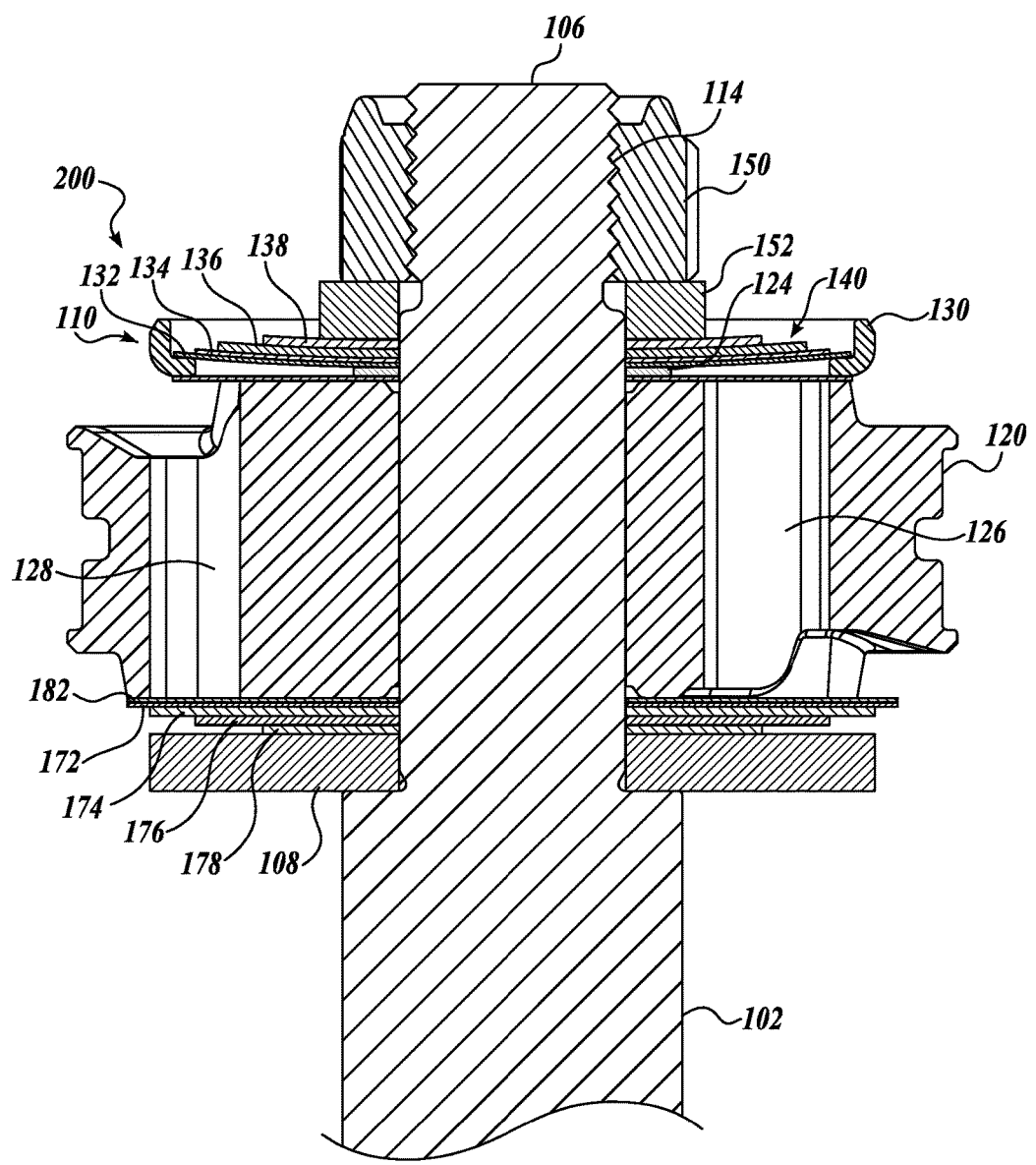
FIG. 7 is a cutaway side view of the damper valve assembly of FIG. 6, showing the cut along arrows 4-4 as indicated in FIG. 3, with a rebound shim stack in a preloaded configuration.
Figure 8:
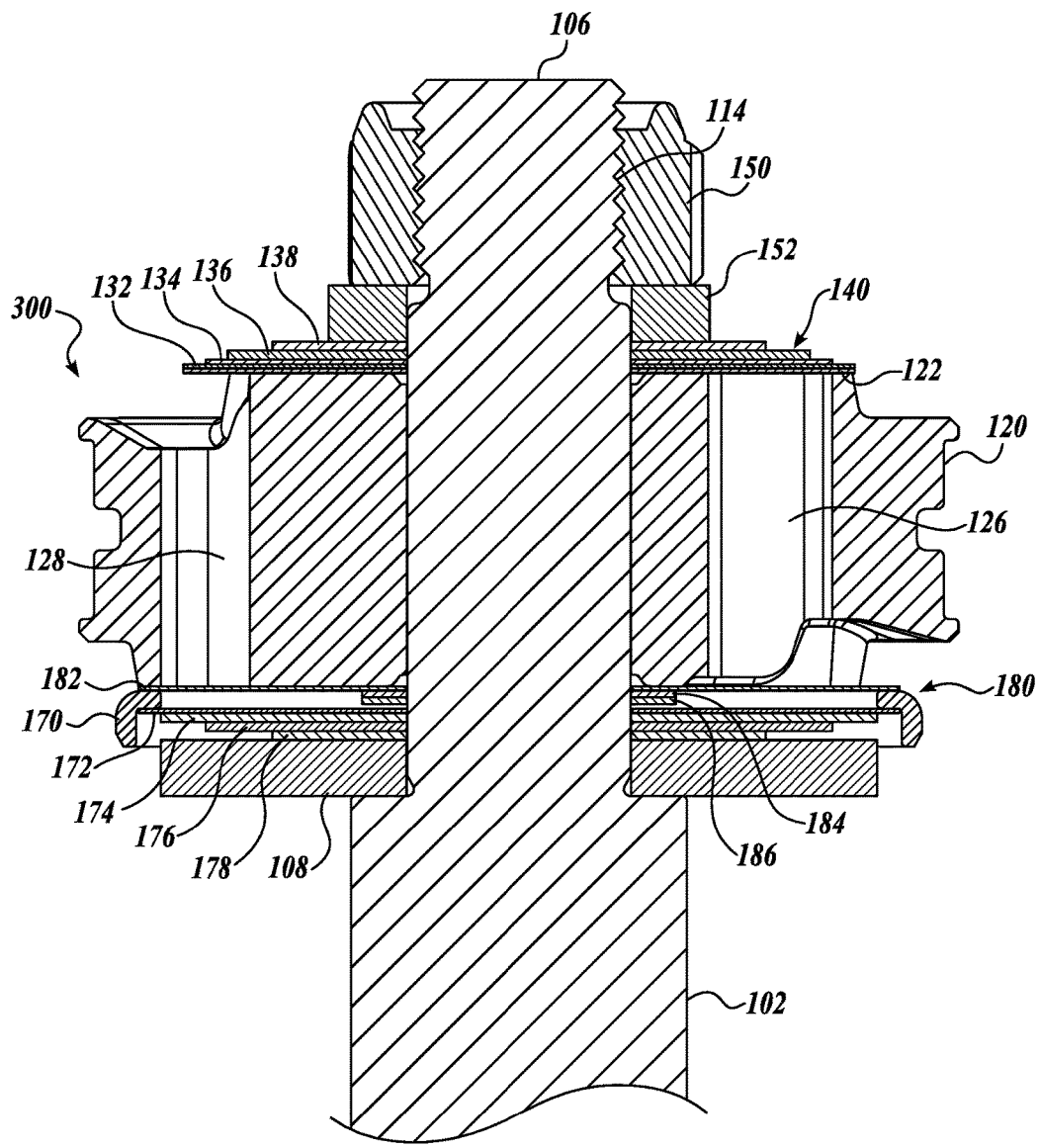
FIG. 8 is a cutaway side view of another representative embodiment of a damper valve assembly in accordance with an aspect of the present disclosure, showing the cut along arrows 4-4 as indicated in FIG. 3.
Figure 9:
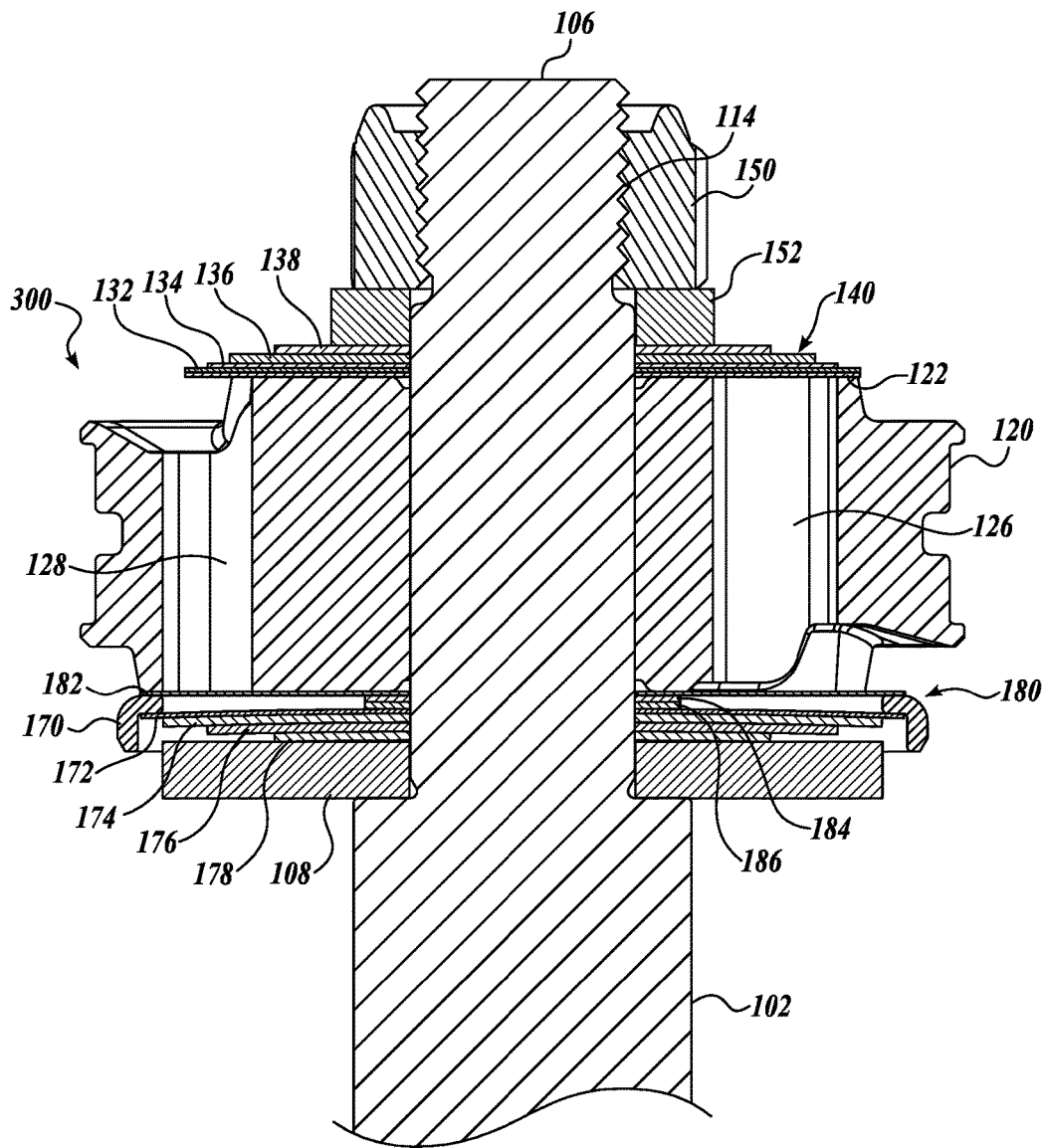
FIG. 9 is a cutaway side view of the damper valve assembly of FIG. 8, showing the cut along arrows 4-4 as indicated in FIG. 3, with a compression shim stack in a preloaded configuration.

As shown in the embodiments of the shimmed piston assembly 100 in FIGS. 1-5, a preload ring shim is used in both the rebound shim assembly 110 and the compression shim assembly 180; however, in other embodiments, a preload ring shim is suitably used on only the rebound shim assembly 110 (see FIGS. 6 and 7), or, conversely, a preload ring shim is suitably used on only the compression shim assembly 180 (see FIGS. 8 and 9). In the embodiments shown in FIGS. 6 and 7 where the compression preload ring shim 180 is omitted, the shim assembly is shown without a preload (FIG. 7) and the first and second compression preload adjustment washers 184 and 186 are likewise omitted. Similarly, in the embodiments shown in FIGS. 8 and 9 where the rebound preload ring shim 130 is omitted, the shim assembly is shown without a preload (FIG. 9) and the rebound preload adjustment washer 124 is likewise omitted.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A damper having a shimmed piston, comprising:
an elongate shaft having a first end and a fastener configured to retain the piston on the first end, the piston having a proximal end, a distal end, and a first valve extending therethrough; and
a first shim assembly disposed around the elongate shaft at the first end and adjacent to the proximal end of the piston, the first shim assembly comprising:
 a first shim having a central aperture configured to receive the elongate shaft, the first shim configured to overlap the first valve at the proximal end of the piston;
 a first ring shim assembled to the first end of the elongate shaft and configured to abut the first shim; and
 a second shim associated with the first ring shim, the second shim interfacing a radially inward projection of the first ring shim such that when the second shim is installed at the first end of the elongate shaft, the second shim is deflectable to provide a preload to the first shim assembly in reaction to clamping the piston with the fastener,
wherein a perimeter of the central aperture of the first shim is fixed in a direction along the elongate shaft by the clamping of the piston with the fastener, and wherein the first shim assembly is configured to deflect away from the piston as a result of damping fluid flow through the first valve.

2. The damper of claim 1, further comprising:
a second valve extending through the piston; and
a second shim assembly disposed around the elongate shaft at the first end adjacent to the distal end of the piston, the second shim assembly comprising a third shim configured to overlap the second valve at the distal end of the piston,
wherein the third shim is configured to deflect away from the piston as a result of damping fluid flow through the second valve.

3. The damper of claim 2, wherein the second shim assembly further comprises:
a second ring shim assembled to the first end of the elongate shaft and configured to abut the third shim; and
a fourth shim associated with the second ring shim, the fourth shim interfacing a radially inward projection of the second ring shim such that when the fourth shim is installed at the first end of the elongate shaft, the fourth shim is selectively deflectable to provide a preload to the second shim assembly in reaction to clamping the piston with the fastener.

4. The damper of claim 1, further comprising a first washer having a first thickness, the first washer disposed between the first shim and the second shim, wherein the first thickness limits the deflection of the second shim upon installation.

5. The damper of claim 3, further comprising a second washer having a second thickness, the second washer disposed between the third shim and the fourth shim, wherein the thickness of the second washer limits the deflection of the fourth shim upon installation.

6. The damper of claim 2, wherein the second valve is configured to allow damping fluid flow therethrough during a rebound stroke of the damper.

7. The damper of claim 1, wherein the first valve is configured to allow damping fluid flow therethrough during a compression stroke of the damper.

8. The damper of claim 1, wherein the first ring shim has a wall projecting axially from a surface of the radially inward projection configured to stiffen the first ring shim upon installation.

9. The damper of claim 1, wherein the radially inward projection of the first ring shim has an axial thickness of about 0.040 inches.

10. The damper of claim 1, wherein the second shim is selectively deflectable.

11. A damper having a shimmed piston, comprising:
an elongate shaft having a first end and a fastener configured to retain the piston on the first end, the piston having a proximal end, a distal end, and first and second valves extending therethrough;
a first shim assembly disposed around the elongate shaft at the first end, and adjacent to the proximal end of the piston, the first shim assembly comprising:
 a first shim having a central aperture configured to receive the elongate shaft, the first shim configured to overlap the first valve at the proximal end of the piston;
 a first ring shim assembled to the first end of the elongate shaft and configured to abut the first shim; and
 a second shim associated with the first ring shim, the second shim interfacing a radially inward annular projection of the first ring shim such that when the second shim is installed at the first end of the elongate shaft, the second shim is deflectable to provide a preload to the first shim assembly in reaction to clamping the piston with the fastener, and
a second shim assembly disposed around the elongate shaft at the first end adjacent to the distal end of the piston, the second shim assembly comprising a third shim configured to overlap the second valve at the distal end of the piston,
wherein a perimeter of the central aperture of the first shim is fixed in a direction along the elongate shaft by the clamping of the piston with the fastener, wherein the first shim assembly is configured to deflect away from the piston as a result of damping fluid flow through the first valve, and wherein the second shim assembly is configured to deflect away from the piston as a result of damping fluid flow through the second valve.

12. The damper of claim 11, wherein the second shim assembly further comprises:
a second ring shim assembled to the first end of the elongate shaft and configured to abut the third shim; and
a fourth shim associated with the second ring shim, the fourth shim interfacing a radially inward annular projection of the second ring shim such that when the fourth shim is installed at the first end of the elongate shaft, the fourth shim is deflected to provide a preload to the second shim assembly in reaction to clamping the piston with the fastener.

13. The damper of claim 11, further comprising a first washer having a first thickness, the first washer disposed between the first shim and the second shim, wherein the first thickness limits the deflection of the second shim upon installation.

14. The damper of claim 13, further comprising a second washer having a second thickness, the second washer disposed between the third shim and the fourth shim, wherein the thickness of the second washer limits the deflection of the fourth shim upon installation.

15. The damper of claim 12, wherein the second valve is configured to allow damping fluid flow therethrough during a rebound stroke of the damper.

16. The damper of claim 11, wherein the first valve is configured to allow damping fluid flow therethrough during a compression stroke of the damper.

17. The damper of claim 11, wherein the first ring shim has a wall projecting axially from a surface of the radially inward annular projection configured to stiffen the first ring shim upon installation.

18. The damper of claim 11, wherein the radially inward annular projection of the first ring shim has an axial thickness of about 0.040 inches.

19. The damper of claim 11, wherein the second shim is selectively deflectable.

* * * * *